United States Patent [19]

Windle

[11] 4,196,012

[45] Apr. 1, 1980

[54] PAPER COATING COMPOSITIONS

[75] Inventor: William Windle, Cornwall, England

[73] Assignee: English Clays Lovering Pochin & Co., St. Austell, England

[21] Appl. No.: 741,998

[22] Filed: Nov. 15, 1976

Related U.S. Application Data

[63] Continuation of Ser. No. 664,176, Mar. 5, 1976, abandoned, which is a continuation of Ser. No. 523,855, Nov. 14, 1974, abandoned, which is a continuation of Ser. No. 94,956, Dec. 3, 1970, abandoned, which is a continuation-in-part of Ser. No. 711,536, Mar. 8, 1968, abandoned.

[30] Foreign Application Priority Data

Mar. 13, 1967 [GB] United Kingdom ............... 11780/67

[51] Int. Cl.[2] ........................ C08J 3/20; C09H 11/00; C09J 3/06

[52] U.S. Cl. .................................... 106/137; 106/214; 260/29.6 R

[56] References Cited

U.S. PATENT DOCUMENTS 2,992,936 7/1961 Rowland ............................. 106/288

3,534,911 10/1970 Gwilliam .............................. 241/16

FOREIGN PATENT DOCUMENTS 453320 12/1948 Canada .................................... 106/306

OTHER PUBLICATIONS

Davidson, Paper Technology, vol. 6, No. 2, Apr. 1965, pp. 107, 108, 116.

Paper Technology, vol. 9, No. 3, 1968. The Future of Whiting in Paper Coating, R. R. Davidson, pp. 220–225, Jun. 1968.

*Primary Examiner*—Theodore Morris

*Attorney, Agent, or Firm*—Cushman, Darby & Cushman

[57] ABSTRACT

A paper coating composition which comprises a dispersion of a pigment in an aqueous medium containing an adhesive, the pigment comprising a natural chalk whiting formed from the remains of coccoliths which has been processed so as to contain at least 60% by weight of particles smaller than 2 microns equivalent spherical diameter, not more than 5% by weight of particles larger than 10 microns equivalent spherical diameter and not more than 0.5% by weight of particles larger than 53 microns.

7 Claims, No Drawings

PAPER COATING COMPOSITIONS

This is a continuation, of application Ser. No. 664,176 filed Mar. 5, 1976, which is a cont. of Ser. No. 523,855 filed Nov. 14, 1974, which is a cont. of Ser. No. 94,956 filed Dec. 3, 1970, which is a CIP of Ser. No. 711,536 filed Mar. 8, 1968 all applications now being abandoned.

BACKGROUND OF THE INVENTION

This invention relates to paper coating compositions and, more particularly, is concerned with paper coating compositions which include a pigment comprising natural chalk whiting.

Many varieties of coated papers are produced today. They are principally coated with a composition, sometimes known as the coating color, which essentially comprises an adhesive, also known as a binder, and a pigment. A discussion of the constituents of paper coating compositions and of the methods of applying such coating compositions to paper is given in Chapter XIX, Volume III, of the 2nd Edition of the book by James P. Casey entitled "Pulp and Paper; Chemistry and Technology". The adhesive used can be, for example, starch, casein or a synthetic resin latex; the particular adhesive used will depend, for example, on the printing process to be used, e.g., offset lithography requires the adhesive to be water-insoluble. Generally, the pigment will consist of a kaolin clay, as the main constituent, and minor amounts, i.e., less than 20% by weight, of one or more other constituents, for example calcium carbonate, lithopone, barium sulphate, titanium pigments, talc or satin white. The calcium carbonate pigment normally used for this purpose is known as precipitated calcium carbonate and is produced by calcining limestone to form carbon dioxide gas and quicklime, the quicklime then being slaked with water to form milk of lime which can then be treated in several ways, for example by recombination with carbon dioxide, to give precipitated calcium carbonate.

An alternative source of calcium carbonate pigment is natural calcium carbonate. There are a large number of different forms of natural chalk, for example marble, limestone and the shells of a number of organisms. Each has its own characteristic properties which may render it more or less suitable for a particular use. By "natural chalk" there is meant hereinafter the naturally occurring calcium carbonate which was formed in the cretaceous period of geological history from the remains of coccoliths. Natural chalk consists of calcite crystals in the form of particles mainly having an equivalent spherical diameter in the range of from 1 to 5 microns which, when mined, are loosely bound together to form larger particles, and is to be distinguished from precipitated calcium carbonate and from other naturally occurring calcium carbonate sources such as ground limestone, marble or oyster shells. The normal commercially-available natural chalk whiting pigments tend to result in coatings of reduced gloss; this has been found to be due to the fact that they generally contain not more than 35% by weight of particles smaller than 2 microns.

As is well known to those skilled in the art of paper coating, the whiting or calcium carbonate used in paper coating compositions consist of chemically prepared material known as precipitated calcium carbonate. There are natural sources of calcium carbonate such as marble, chalk, shells of mullusks, eggshells, coral and pearl. However, the naturally occurring calcium carbonate has never been found useful and competitive with precipitated calcium carbonate in the paper coating art because it does not produce as fine a quality coating.

The fact that natural chalk and other forms of natural calcium carbonate has not found commercial use in the paper coating trade is documented in The Encyclopedia of Chemical Technology, Kirk-Othmer, 2nd Edition, under the dicussion of calcium carbonate in Vol. 4 pages 7–11 and under the discussion of paper pigments, Vol. 14, pages 515–517. In addition, Canadian Pat. No. 453,320, issued on Dec. 14, 1948 to Harold R. Rafton specifically mentions at Page 15, column 27, lines 28–52, page 23, column 45, lines 40–58 and column 46, lines 56–65 that paper coated with naturally occurring calcium carbonates does not have the quality of that coated with precipitated calcium carbonate.

SUMMARY OF THE INVENTION

It has now been found possible to obtain a calcium carbonate pigment containing a large percentage of fine particles, i.e., particles smaller than 2 microns, by processing a natural chalk whiting and that by the use of such a processed natural chalk whiting it is possible to prepare a paper coating composition employing substantial quantities of a calcium carbonate pigment without adverse affects on the gloss characteristics of the coated paper. More particularly, in accordance with the present invention there is provided a paper coating composition which comprises a dispersion of a pigment in an aqueous medium containing an adhesive, wherein there is employed an improved pigment which comprises a natural chalk whiting *formed from the remains of coccoliths* which has been processed so as to contain at least 60% by weight of particles smaller than 2 microns equivalent spherical diameter, not more than 5% by weight of particles larger than 10 microns equivalent spherical diameter, not more than 0.05% by weight of particles larger than 53 microns and no particles larger than 100 microns.

The processed natural chalk whiting used in the present invention is substantially cheaper to produce than a precipitated calcium carbonate having a similar particle size analysis.

DESCRIPTION OF THE PREFERRED EMBODIMENTS

Advantageously, the natural chalk whiting is processed so as to contain 70–95% by weight of the particles having an equivalent spherical diameter smaller than 2 microns.

The processed natural chalk whiting used in the paper coating composition of the present invention can be prepared by any known process capable of producing a product with the desired particle size analysis, e.g. by comminuting a natural chalk, for example by grinding in a conventional ball mill, by grinding with sand or by grinding with a jet pulverizer, e.g. a micronizer, or by particle size classification of a natural chalk in order to separate therefrom the undesired coarse material. Preferably, the natural chalk whiting is produced by means of the process disclosed in U.S. Pat. No. 3,534,911, issued on Oct. 20, 1970, and assigned to the same assignee as this application, which process comprises the steps of (a) grinding a crude natural chalk containing hard impurities in an aqueous medium at a solids content of the range of from 60 to 75% by weight and in the presence of from 0.05 to 0.50% by weight, based on the weight of chalk, of a dispersing agent, for example a salt of a polyphosphoric acid, a salt of a polysilic acid, a salt of a polyacrylic acid, a salt of a polymethacrylic acid, a dinaphthylmethane sulphonate, a lignosulphonate or an alginate, e.g. sodium alginate based on the weight of chalk, for a time sufficient to form a fluid suspension of the natural chalk particles, (b) separating the fluid suspension of natural chalk particles thus formed from the hard impurities and (c) drying the suspension of chalk particles to obtain a natural chalk whiting having a dispersing agent deposited thereon.

The processed natural chalk whiting used in the paper coating compositions of the preset invention will normally be admixed with a paper coating clay pigment. Generally, such a clay pigment will be a kaolin clay having a particle size distribution such that at least 50% by weight consists of particles smaller than 2 microns equivalent spherical diameter, not more than 15% by weight consists of particles larger than 10 microns equivalent spherical diameter, not more than 0.05% by weight consists of particles larger than 53 microns and no particles being larger than 75 microns.

A paper coating composition according to the present invention will normally contain about 100 parts by weight of pigment, 10–25 parts by weight of adhesive and 50–125 parts by weight of water. Preferably, the pigment used comprises at least 25% by weight of the natural chalk whiting.

The adhesive used in the paper coating compositions of the present invention can be an amylaceous, proteinaceous or synthetic resin latex adhesive, for example a starch, gelatin, casein or a styrene/butadiene resin latex. The paper coating compositions of the present invention may also contain conventional additives, for example eveners, anti-foaming agents, wetting agents, dyestuffs, pigment-dispersing agents, softening agents and fluidifiers, e.g. pine oils, sulphonated oils, soaps, wax emulsions and resin emulsions. The paper coating compositions can be applied to a paper base using conventional coating apparatus, for example knife edge, air blade and trailing blade coaters.

After coating with a paper coating composition according to the present invention, the coated sheets can be subjected to a supercalendering treatment in order to obtain the desired surface characteristics.

The invention is illustrated by the following Examples.

EXAMPLE 1

Samples of a normal wood-free, trailing blade coating base paper, manufactured by Alex Pirie Ltd., were coated by the trailing blade method with paper coating compositions to give in each case a coat weight of 10 g.s.m. For one series of samples the paper coating compositions included a pigment comprising 50% by weight of a kaolin clay (DINKIE A) which had a particle size analysis such that 75% by weight consisted of particles smaller than 2 microns equivalent spherical diameter, 0.3% by weight consisted of particles larger than 10 microns equivalent spherical diameter, and not more than 0.01% by weight consists of particles larger than 53 microns, and 50% by weight of a commercially-available natural calcium carbonate containing 32% by weight of particles smaller than 2 microns, 6% by weight of particles larger than 10 microns and 0.05% by weight of particles larger than 300 B.S. mesh; for another series of samples the paper coating composition included a pigment comprising 50% by weight of the same clay (DINKIE A) as was used in said one series and 50% by weight of a processed natural chalk whiting in accordance with the present invention and containing 80% by weight of particles having an equivalent spherical diameter smaller than 2 microns, 2% by weight of particles having an equivalent spherical diameter larger than 10 microns and 0.02% by weight of particles larger than 53 microns (i.e., particles not passing through a No. 300 mesh B.S. sieve). The processed natural chalk whiting was prepared by deflocculating a natural chalk whiting slurry and subjecting it to a particle size classification process by direct sedimentation methods and rejecting the coarse particles. This process was carried out according to the method disclosed in the above-mentioned U.S. Pat. No. 3,534,911; a flint-free chalk suspension taken from a pebble mill was sieved through a foraminous plate and through three sieves, as shown in FIG. 1 of the specification; the suspension was then diluted to a solids content of 25% by weight and was allowed to stand for a time sufficient to permit all the particles equal to or larger than 5 microns equivalent spherical diameter to settle. The supernatant suspension was then separated from the sediment, flocculated with a polyacrylamide flocculating agent, filter pressed and dried in a turbo-tray drier. The dried whiting was then ground to the desired particle size distribution in a hammer mill.

The adhesives used in the paper coating compositions are set out in the column headings of Table I below; in each case the quantity of adhesive used is given as a % by weight based on the total pigment.

After coating, the coated sheets were supercalendered on a laboratory supercalender comprising one metal roll and one filled roll. The coated sheets were fastened to the metal roll and subjected to 10 passes at 85° C. and at a line pressure of 250 lb. per linear inch. This supercalendering treatment corresponds approximately to 10 passes at 85° C. and at a line pressure of 500 lb. per linear inch on a conventional works supercalender.

The figures in the body of Table I below are a measure of the gloss of the coated sheets in TAPPI gloss units.

TABLE I

| Adhesive / Pigment | 20% starch | 10% starch 10% latex | 15% casein | 7.5% casein 7.5% latex[(1)] |
|---|---|---|---|---|
| Natural Chalk Whiting | 18.6 | 26.3 | 29.8 | 34.5 |
| Processed Natural Chalk Whiting | 34.2 | 51.1 | 56.9 | 62.2 |

[(1)]A styrene-butadiene latex No. 636 manufactured by The Dow Chemical Co. Ltd.

EXAMPLE 2

In this Example samples of the wood-free, trailing blade coating base paper used in Example 1 were coated by an air-knife coater to give in each case a coat weight of 20 g.s.m. For one series of samples the paper coating composition included a pigment comprising 50% by weight of a clay (DINKIE A) and 50% by weight of the commercially-available natural chalk whiting used in Example 1; for another series of samples the paper coating composition included a pigment comprising 50% by weight of a clay (DINKIE A) and 50% by weight of a processed natural chalk whiting in accordance with the invention and containing 75% by weight of particles having an equivalent spherical diameter smaller than 2 microns, 3% by weight of particles having an equivalent spherical diameter larger than 10 microns and 0.03% by weight of particles larger than No. 300 mesh B.S. sieve. The processed natural chalk whiting was prepared by means of the apparatus described with reference to FIG. 2 of the above-mentioned U.S. Pat. No. 3,534,911.

The adhesive used in the paper coating compositions are set out in the column headings of Table II below; in each case the quantity of adhesive used is given as a % by weight based on the total pigment.

After coating, the coated sheets were supercalendered in the manner described in Example 1 by 10 passes, on the laboratory supercalender, at 85° C. and at a line pressure of 250 lb. per linear inch.

The figures in the body of Table II below are a measure of the gloss of the coated sheets in TAPPI gloss units.

TABLE II

| Adhesive / Pigment | 20% starch | 10% starch 10% latex | 15% casein | 7.5% casein 7.5% latex[1] |
|---|---|---|---|---|
| Natural chalk Whiting | 23.7 | 37.9 | 41.9 | 47.4 |
| Processed Natural chalk Whiting | 46.5 | 59.2 | 66.3 | 70.3 |

[1] A styrene/butadiene latex No. 636 manufactured by The Dow Chemical Co. Ltd.

EXAMPLE 3

In this Example samples of the wood-free, trailing blade coating base paper used in Example 1 were coated by a Massey Coater to give in each case a coat weight of 10 g.s.m. For one series of samples the paper coating composition included a pigment comprising 50% by weight of a clay (DINKIE A) and 50% by weight of the commercially-available natural chalk whiting used in Example 1; for another series of samples the paper coating composition included a pigment comprising 50% by weight of a clay (DINKIE A) and 50% by weight of a processed natural chalk whiting in accordance with the invention and containing 82% by weight of particles having an equivalent spherical diameter smaller than 2 microns, 2% by weight of particles having an equivalent spherical diameter larger than 10 microns and 0.01% by weight of particles larger than a No. 300 mesh B.S. sieve. The processed natural chalk whiting was prepared by means of the grinding method and apparatus described with reference to FIG. 1 in the above-mentioned U.S. Pat. No. 3,534,911, and the dry powdered natural chalk whiting was subjected to a further comminution in a "Micronizer", i.e., a fluid energy mill.

The adhesives used in the paper coating compositions are set in the column headings of Table III below; in each case the quantity of adhesive used in given as a % by weight based on the total pigment.

After coating, the coated sheets were supercalendered in the manner described in Example 1 and 10 passes, on the laboratory supercalender, at 85° C. and at a line pressure of 250 lb. per linear inch.

The figures in the body of Table III below are a measure of the gloss of the coated sheets in TAPPI gloss units.

Table III

| Adhesive / Pigment | 20% starch | 10% starch 10% latex | 15% casein | 7.5% casein 7.5% latex[1] |
|---|---|---|---|---|
| Natural chalk Whiting | 18.4 | 27.2 | 28.5 | 32.7 |
| Processed Natural chalk Whiting | 31.6 | 47.8 | 56.9 | 60.9 |

[1] A styrene/butadiene latex No. 636 manufactured by The Dow Chemical Co. Ltd.

EXAMPLE 4

In this Example samples of the wood-free, trailing blade coating base paper used in Example 1 were coated by a Champion coater to give in each case a coat weight of 10 g.s.m. For one series of samples the paper coating composition included a pigment comprising 50% by weight of a clay (DINKIE A) and 50% by weight of the commercially-available natural chalk whiting used in Example 1; for another series of samples the paper coating composition included a pigment comprising 50% by weight of a clay (DINKIE A) and 50% by weight of a processed natural chalk whiting in accordance with the invention and containing 70% by weight of particles having an equivalent spherical diameter smaller than 2 microns, 3% by weight of particles having an equivalent spherical diameter larger than 10 microns and 0.03% by weight of particles larger than a No. 300 mesh B.S. sieve. The processed natural chalk whiting was prepared by means of the grinding method and apparatus described with reference to FIG. 2 of the above-mentioned U.S. Pat. No. 3,534,911 except that the mill 22 contained, as the grinding medium, grinding balls 1 to 2 inches in size.

The adhesive used in the paper coating compositions are set out in the column headings of Table IV below; in each case the quantity of adhesive used is given as a % by weight based on the total pigment.

After coating, the coated sheets were supercalendered in the manner described in Example 1 by 10 passes, on a laboratory supercalender, at 85° C. and at a line pressure of 250 lb. per linear inch.

The figures in the body of Table IV below are a measure of the gloss of the coated sheets in TAPPI gloss units.

Table IV

| Adhesive / Pigment | 20% starch | 10% starch 10% latex | 15% casein | 7.5% casein 7.5% latex[1] |
|---|---|---|---|---|
| Natural chalk Whiting | 15.9 | 23.2 | 28.2 | 29.4 |
| Processed Natural chalk Whiting | 29.2 | 40.4 | 57.8 | 58.7 |

[1] A styrene/butadiene latex No. 636 manufactured by The Dow Chemical Co. Ltd.

Although in all the foregoing Examples the latex used was a styrene/butadiene latex manufactured by The Dow Chemical Co. Ltd., it may be noted that other latexes normally used in paper coating, for example those based on acrylic polymers or polyvinyl acetate, can be used.

EXAMPLE 5

In this Example samples of the wood-free trailing base coating paper used in Example 1 were coated by the trailing blade method with paper coating compositions to give in each case a coat weight of 10 g.s.m. For one series of samples the paper coating composition included a pigment comprising 75% by weight of a clay (DINKIE A) and 25% by weight of the commercially available natural chalk whiting used in Example 1; for another series of samples the paper coating composition included a pigment comprising 75% by weight of a clay (DINKIE A) and 25% by weight of a processed natural chalk whiting in accordance with the invention and containing 80% by weight of particles having an equivalent spherical diameter smaller than 2 microns, 2% by weight of particles having an equivalent spherical diameter larger than 10 microns and 0.02% by weight of particles larger than a No. 300 mesh B.S. sieve. The processed natural chalk whiting was prepared by the same method as was employed in Example 1 above.

The adhesives used in the paper coating compositions are set out in the column headings of Table V below; in each case the quantity of adhesive used is given as % by weight based on the total pigment.

After coating, the coated sheets were supercalendered in the manner described in Example 1 by 10 passes, on a laboratory supercalender, at 85° C. and at a line pressure of 250 lb. per linear inch.

The figures in the body of Table V below are a measure of the gloss of the coated sheets in TAPPI gloss units.

Table V

| Pigment / Adhesive | 20% starch | 10% starch 10% latex | 15% casein | 7.5% casein 7.5% latex[1] |
|---|---|---|---|---|
| Natural chalk Whiting | 26.1 | 32.5 | 35.6 | 41.2 |
| Processed Natural Chalk Whiting | 37.5 | 53.2 | 58.0 | 64.7 |

[1] A styrene/butadiene latex No. 636 manufactured by The Dow Chemical Co. Ltd.

EXAMPLE 6

The conditions and the pigments used are identical to those used in Example 5 except that both the compositions containing natural chalk whiting and those containing processed natural chalk whiting comprised 25% by weight of clay (DINKIE A) and 75% by weight of chalk whiting. The adhesives used and the supercalendering conditions are identical to those used in Example 5.

The figures in the body of Table VI below are a measure of the gloss of the coated sheets in TAPPI gloss units.

Table VI

| Pigment / Adhesive | 20% starch | 10% starch 10% latex | 15% casein | 7.5% casein 7.5% latex |
|---|---|---|---|---|
| Natural chalk Whiting | 13.4 | 18.5 | 23.7 | 29.6 |
| Processed Natural chalk Whiting | 30.8 | 47.4 | 51.3 | 57.4 |

EXAMPLE 7

In this Example samples of the wood-free, trailing blade coating base paper used in Example 2 were coated by the trailing blade method with paper coating compositions each comprising 50% by weight of a kaolin clay which had a particle size distribution such that 75% by weight consisted of particles smaller than 2 microns equivalent spherical diameter, 0.3% by weight of particles larger than 10 microns equivalent spherical diameter and 0.01% by weight of particles larger than 53 microns, and 50% by weight of a precipitated calcium carbonate pigment which had a median particle diameter of 0.8 microns equivalent spherical diameter, i.e., approximately equivalent in particle size distribution to the processed natural chalk whiting used in Example 2. In each case the coating weight was 10 g.s.m.

The adhesives used in the paper coating compositions are set out in the column heading of Table VII below; in each case the quantity of adhesive used is given as a % by weight based on the total pigment. The total solids content of each paper coating composition is also given in Table VII as a % by weight.

After coating, the coated sheets were supercalendered in the manner described in Example 2 by 10 passes on the laboratory supercalender at 85° C. and at a line pressure of 250 lb. per linear inch. The coated sheets were tested for gloss by the standard TAPPI gloss test and for bonding strength of the coating to the base paper by the I.G.T. pick test. The results are given in Table VII.

As a comparison the results obtained from similar tests using, as the pigment, the 50/50 mixture of clay and processed natural chalk whiting as described in Example 2 are also given in Table VII.

Table VII

| Pigment | Adhesives | 20% starch | 10% starch 10% latex | 15% casein | 7.5% casein 7.5% latex |
|---|---|---|---|---|---|
| Processed Natural Chalk Whiting | % solids | 62 | 60 | 61 | 60 |
| | TAPPI gloss | 46.5 | 59.2 | 66.3 | 70.3 |
| | IGT pick velocity (ft/min) | 241 | 304 | 289 | 308 |
| Precipitated calcium carbonate | % solids | 61 | 59 | 60 | 60 |
| | TAPPI gloss | 38.3 | 53.2 | 58.4 | 63.8 |
| | IGT pick velocity (ft.min) | 202 | 258 | 250 | 271 |

These results show that the coatings containing processed natural chalk whiting are at least comparable in gloss to those containing precipitated calcium carbonate, and that in addition the processed natural chalk whiting has the advantage that (i) for a given composition viscosity, it can be used at a higher total solids content, and (ii) for a given adhesive system the coating is more strongly bound, i.e., the adhesive demand is less. The cost of the processed natural chalk pigment is about one half to two thirds of the cost of the precipitated calcium carbonate.

What is claimed is:

1. In a paper coating composition which comprises a dispersion of a pigment in an aqueous medium containing an adhesive, the improvement which comprises employing a pigment which comprises a natural chalk whiting formed from the remains of coccoliths which has been processed so as to contain from 70 to 95% by weight of particles smaller than 2 microns equivalent spherical diameter, not more than 5% by weight of particles larger than 10 microns equivalent spherical diameter and not more than 0.05% by weight of particles larger than 53 microns.

2. A paper coating composition as claimed in claim 1, wherein the natural chalk whiting comprises at least 25% by weight of said pigment.

3. A paper coating composition according to claim 1, wherein the pigment comprises, in combination with said natural chalk whiting, a kaolin clay, of which at least 50% by weight consists of particles smaller than 2 microns equivalent spherical diameter, not more than 15% by weight consists of particles larger than 10 microns equivalent spherical diameter, and not more than 0.05% by weight consists of particles larger than 53 microns.

4. A paper coating composition which consists essentially of a dispersion of a pigment in an aqueous medium containing an amylaceous, proteinaceous or synthetic resin latex adhesive, wherein the pigment consists of a kaolin clay of which at least 50% by weight consists of particles smaller than 2 microns equivalent spherical diameter, not more than 15% by weight consists of particles larger than 10 microns equivalent spherical diameter and not more than 0.05% consists of particles larger than 53 microns, and a natural chalk whiting formed from the remains of coccoliths and which has been processed so as to contain from 70 to 95% by weight of particles smaller than 2 microns equivalent spherical diameter, not more than 5% by weight of particles larger than 10 microns equivalent spherical diameter, and not more than 0.05% by weight of particles larger than 53 microns, the natural chalk whiting constituting at least 25% by weight of the total pigment content of the paper coating composition.

5. A paper coating composition as claimed in claim 4, which contains from 10 to 25 parts by weight of said adhesive and from 50 to 125 parts by weight of water per 100 parts by weight of said pigment.

6. A paper coating composition which comprises a dispersion of about 100 parts by weight of pigment in an aqueous medium containing about 10–25 parts by weight of adhesive and 50–125 parts by weight of water, said pigment comprising a natural chalk whiting formed from the remains of coccoliths which has been processed so as to contain from 70 to 95% by weight of particles smaller than 2 microns equivalent spherical diameter, not more than 5% by weight of particles larger than 10 microns equivalent spherical diameter and not more than 0.05% by weight of particles larger than 53 microns, said natural chalk whiting comprising at least 25% by weight of said pigment.

7. In a paper coating composition which comprises a dispersion of a pigment in an aqueous medium containing an adhesive, the improvement which comprises employing a pigment which comprises a natural chalk whiting formed from the remains of coccoliths which has been processed so as to contain from 70 to 95% by weight of particles smaller than 2 microns equivalent spherical diameter, not more than 5% by weight of particles larger than 10 microns equivalent spherical diameter and not more than 0.05% by weight of particles larger than 53 microns, the composition consisting essentially of 100 parts by weight of pigment, at least 25% by weight comprising and natural chalk whiting, 10–25 parts by weight of adhesive and 50–125 parts by weight of water.

* * * * *